United States Patent Office
3,709,890
Patented Jan. 9, 1973

3,709,890
PROCESS FOR THE PREPARATION OF DIMERIC IMINES AND PYRROLES
John Charles Leffingwell, Winston-Salem, N.C., assignor to R. J. Reynolds Tobacco Company, Winston-Salem, N.C.
No Drawing. Continuation-in-part of application Ser. No. 759,750, Sept. 13, 1968, which is a continuation-in-part of application Ser. No. 595,001, Nov. 17, 1966. This application Apr. 9, 1970, Ser. No. 27,173
Int. Cl. C07d 27/20; C07c 119/00
U.S. Cl. 260—283 R  8 Claims

ABSTRACT OF THE DISCLOSURE

The production of dimeric imines (Schiff bases) and pyrroles from monomeric imines by treating monomeric imines with manganese dioxide, nickel peroxide or lead dioxide.

---

This application is a continuation-in-part of my copending application Ser. No. 759,750 filed Sept. 13, 1968, now abandoned, which in turn is a continuation-in-part of my application Ser. No. 595,001 filed Nov. 17, 1966, now abandoned.

This invention relates to synthesis of organic compounds and more particularly to the synthesis of organic compounds from monomeric imines.

In general, the present invention relates to the discovery that dimeric imines (Schiff bases) and pyrroles can be readily obtained from monomeric imines by treating the monomeric imines with manganese dioxide or nickel peroxide or lead dioxide. The synthesis is applicable generally to the conversion of organic monomeric imines having at least one hydrogen atom in alpha position to the aldimine function. When the carbon atom in alpha position to the aldimine function is saturated and contains only one hydrogen atom, coupling of the monomeric imine takes place to yield a dimeric imine. This reaction can be generally illustrated as follows:

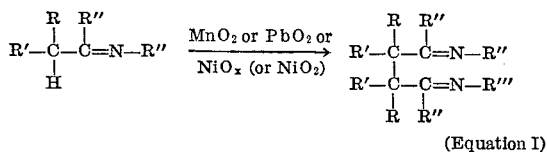

(Equation I)

wherein

R=alkyl of 1 to 10 carbon atoms, cycloalkyl of 3 to 8 carbon atoms, alkenyl of 3 to 10 carbon atoms, aryl selected from phenyl and naphthyl, heteroaryl selected from furyl, pyrryl, thienyl, pyridyl, quinolyl and indolyl, aralkyl of 8 to 10 carbon atoms, alkaryl of 7 to 11 carbon atoms;

R′=alkyl of 1 to 10 carbon atoms, cycloalkyl of 3 to 8 carbon atoms, alkenyl of 3 to 10 carbon atoms, aryl selected from phenyl and naphthyl, heteroaryl selected from furyl, pyrryl, thienyl, pyridyl, quinolyl and indolyl, aralkyl of 8 to 10 carbon atoms, alkaryl of 7 to 11 carbon atoms, or

considered as a unit is an alicyclic radical of 3 to 8 carbon atoms;

R″=hydrogen, alkyl of 1 to 5 carbon atoms, cycloalkyl of 3 to 8 carbon atoms, alkenyl of 3 to 6 carbon atoms, aryl selected from phenyl and naphthyl, heteroaryl selected from furyl, pyrryl, thienyl, pyridyl, quinolyl and indolyl, aralkyl of 8 to 10 carbon atoms, alkaryl of 7 to 11 carbon atoms; and R‴=alkyl of 1 to 12 carbon atoms, cycloalkyl of 3 to 8 carbon atoms, aralkyl of 8 to 10 carbon atoms and aryl selected from phenyl and naphthyl;

provided further that each of the said aryl groups can be with or without substituents selected from halogen, alkoxyl or nitro.

Representative groups for R, R′, R″ and R‴ thus include methyl, ethyl, propyl, isopropyl, butyl, isobutyl, pentyl, hexyl, heptyl, octyl, nonyl, decyl, undecyl, dodecyl, cyclopropyl, cyclobutyl, cyclopentyl, cyclohexyl, cycloheptyl, cyclooctyl, 4-hexenyl, 4-phenylhexyl, 4-phenylpentyl, 3-phenylpropyl, 3-anisylpropyl, phenylethyl, phenyl, p-chlorophenyl, p-methoxyphenyl, p-nitrophenyl, p-tolyl, m-tolyl, p-ethylphenyl, p-propylphenyl, p-butylphenyl, furyl, thienyl, pyrryl, pyridyl, quinolyl, indolyl and the like.

Specific imines representative of the foregoing are:

N-(2-ethylbutylidene)-methylamine
N-(2-ethylbutylidene)-ethylamine
N-(2-ethylbutylidene)-propylamine
N-(2-ethylbutylidene)-isopropylamine
N-(2-ethylbutylidene)-butylamine
N-(2-ethylbutylidene)-hexylamine
N-(2-ethylbutylidene)-octylamine
N-(2-ethylbutylidene)-decylamine
N-(2-ethylbutylidene)-dodecylamine
N-(2-ethylbutylidene)-cyclopropylamine
N-(2-ethylbutylidene)-cyclobutylamine
N-(2-ethylbutylidene)-cyclopentylamine
N-(2-ethylbutylidene)-cyclohexylamine
N-(2-ethylbutylidene)-cycloheptylamine
N-(2-ethylbutylidene)-cyclooctylamine
N-(2-ethylbutylidene)-benzylamine
N-(2-ethylbutylidene)-p-methoxybenzylamine
N-(2-ethylbutylidene)-p-chlorobenzylamine
N-(2-ethylbutylidene)-aniline
N-(2-ethylbutylidene)-p-bromobenzylamine
N-(2-ethylbutylidene)-p-nitrobenzylamine
N-(2-ethylbutylidene)-5′-phenylpentylamine
N-(2-ethylbutylidene)-2′-ethyl-4′-phenylbutylamine
N-isobutylidenemethylamine
N-isobutylidenehexylamine
N-isobutylidenedodecylamine
N-isobutylidenecyclohexylamine
N-isobutylidene-m-nitrobenzylamine
N-isobutylidene-p-nitroaniline
N-isobutylidene-p-chloroaniline
N-isobutylidene-p-methoxyaniline
N-isobutylidene-2′-ethyl-3(-phenylbutylamine
N-(2-decyldodecylidene)-ethylamine
N-(2-decyldodecylidene)-heptylamine
N-(2-decyldodecylidene)-decylamine
N-(2-decyldodecylidene)-cyclooctylamine
N-(2-decyldodecylidene)-o-chlorobenzylamine
N-(2-methyl-2-cyclopentaneethylidene)-methylamine
N-(2-methyl-2-cyclopentaneethylidene)-dodecylamine
N-(2-methyl-2-cyclopentaneethylidene)-benzylamine
N-(2,2-dicyclopropylethylidene)-ethylamine
N-(2,2-dicyclopropylethylidene)-hexylamine
N-(2,2-dicyclopropylethylidene)-cyclohexylamine
N-(2,2-dicyclopropylethylidene)-cyclooctylamine
N-(2,2-dicyclopropylethylidene)-decylamine
N-(2,2-dicyclopropylethylidene)-p-ethoxybenzylamine
N-(2,2-dicyclopropylethylidene)-2′-ethyl-4′-phenylbutylamine
N-(2-methyl-2-cyclooctylethylidene)isopropylamine
N-(2-methyl-2-cyclooctylethylidene)-cyclopentylamine
N-(2-methyl-2-cyclooctylethylidene)-undecylamine N-(2-methyl-2-cyclooctylethylidene)-m-bromobenzylamine
N-(2-methyl-2-cyclooctylethylidene)-2'-methyl-2'-phenylpropylamine
N-(2-phenyl-2-cyclohexylethylidene)-ethylamine
N-(2-phenyl-2-cyclohexylethylidene)-octylamine
N-(2-phenyl-2-cyclohexylethylidene)-dodecylamine
N-(2-phenyl-2-cyclohexylethylidene)-cyclopropylamine
N-(2-phenyl-2-cyclohexylethylidene)-cyclohexylamine
N-(2-phenyl-2-cyclohexylethylidene)-benzylamine
N-(2-phenyl-2-cyclohexylethylidene)-4'-phenylbutylamine
N-(2,2-dicyclooctylethylidene)-methylamine
N-(2,2-dicyclooctylethylidene)-dodecylamine
N-(2,2-dicyclooctylethylidene)-p-methoxybenzylamine
N-(2-methyl-6-heptenylidene)-ethylamine
N-(2-methyl-6-heptenylidene)-butylamine
N-(2-methyl-6-heptenylidene)-isoamylamine
N-(2-methyl-6-heptenylidene)-cyclohexylamine
N-(2-methyl-6-heptenylidene)-cyclopropylamine
N-(2-methyl-6-heptenylidene)-undecylamine
N-(2-methyl-6-heptenylidene)-o-chlorobenzylamine
N-(2-methyl-6-heptenylidene)-m-methoxybenzylamine
N-(2-methyl-6-heptenylidene)-4'-phenylbutylamine
N-(2-methyl-6-heptenylidene)-aniline
N-(2-decenyldodecenylidene)-methylamine
N-(2-decenyldodecenylidene)-hexylamine
N-(2-decenyldodecenylidene)-dodecylamine
N-(2-decenyldodecenylidene)-cyclopropylamine
N-(2-decenyldodecenylidene)-cycloheptylamine
N-(2-decenyldodecenylidene)-p-ethoxybenzylamine
N-(2-decenyldodecenylidene)-4'-phenylbutylamine
N-(cyclopropanemethylidene)-methylamine
N-(cyclopropanemethylidene)-isobutylamine
N-(cyclopropanemethylidene)-decylamine
N-(cyclopropanemethylidene)-cyclopropylamine
N-(cyclopropanemethylidene)-cyclohexylamine
N-(cyclopropanemethylidene)-cyclooctylamine
N-(cyclopropanemethylidene)-benzylamine
N-(cyclopropanemethylidene)-aniline
N-(cyclopropanemethylidene)-3'-phenylpropylamine
N-(cyclooctanemethylidene)-ethylamine
N-(cyclooctanemethylidene)-hexylamine
N-(cyclooctanemethylidene)-dodecylamine
N-(cyclooctanemethylidene)-cyclobutylamine
N-(cyclooctanemethylidene)-cycloheptylamine
N-(cyclooctanemethylidene)-p-nitrobenzylamine
N-(cyclooctanemethylidene)-3'-phenylbutylamine
N-(2,2-diphenylethylidene)-methylamine
N-(2,2-diphenylethylidene)-heptylamine
N-(2,2-diphenylethylidene)-dodecylamine
N-(2,2-diphenylethylidene)-cyclobutylamine
N-(2,2-diphenylethylidene)-cyclopentylamine
N-(2,2-diphenylethylidene)-cyclooctylamine
N-(2,2-diphenylethylidene)-benzylamine
N-(2,2-di-p-anisylethylidene)-propylamine
N-(2,2-di-p-anisylethylidene)-octylamine
N-(2,2-di-p-anisylethylidene)-cycloheptylamine
N-(2,2-di-p-anisylethylidene)-p-chlorobenzylamine
N-(2,2-di-p-anisylethylidene)-3'-phenylpropylamine
N-(2,2-di-p-anisylethylidene)-p-chloroaniline
N-(2-[1-naphthyl]-propylidene)-methylamine
N-(2-[1-naphthyl]-propylidene)-hexylamine
N-(2-[1-naphthyl]-propylidene)-cyclohexylamine
N-(2-[1-naphthyl]-propylidene)-3'-phenylbutylamine
N-(2-[1-naphthyl]-propylidene)-p-nitrobenzylamine
N-(2-[2-furyl]-propylidene)-propylamine
N-(2-[2-furyl]-propylidene)-cyclohexylamine
N-(2-[2-furyl]-propylidene)-benzylamine
N-(2-[2-pyrryl]-propylidene)-butylamine
N-(2-[2-pyrryl]-propylidene)-cyclopentylamine
N-(2-[2-pyrryl]-propylidene)-p-methoxybenzylamine
N-(2-[2-pyrryl]-propylidene)-3'-phenylpropylamine
N-(2-[2-thienyl]-butylidene)-ethylamine
N-(2-[2-thienyl]-butylidene)-cycloheptylamine
N-(2-[2-thienyl]-butylidene)-p-chlorobenzylamine
N-(2-[2-thienyl]-butylidene)-4'-phenylbutylamine
N-(2-[3-pyridyl]-propylidene)-isopropylamine
N-(2-[3-pyridyl]-propylidene)-cyclohexylamine
N-(2-[3-pyridyl]-propylidene)-o-chlorobenzylamine
N-(2-[3-pyridyl]-propylidene)-4'-phenylbutylamine
N-(2-[4-quinolyl]-propylidene)-methylamine
N-(2-[4-quinolyl]-propylidene)-cyclobutylamine
N-(2-[4-quinolyl]-propylidene)-benzylamine
N-(2-[4-quinolyl]-propylidene)-3'-phenylpropylamine
N-(2-[3-indolyl]-butylidene)-isopropylamine
N-(2-[3-indolyl]-butylidene)-cycloheptylamine
N-(2-[3-indolyl]-butylidene)-benzylamine
N-(2-[3-indolyl]-butylidene)-3-phenylbutylamine
N-(2-[4-amylphenyl]-propylidene)-butylamine
N-(2-[4-amylphenyl]-propylidene)-cyclohexylamine
N-(2-[4-amylphenyl]-propylidene)-p-ethoxybenzylamine
N-(2-[4-amylphenyl]-propylidene)-3'-phenylpropylamine
N-(2-[4-methylphenyl]-butylidene)-isopropylamine
N-(2-[4-methylphenyl]-butylidene)-cycloheptylamine
N-(2-[4-methylphenyl]-butylidene)-p-chlorobenzylamine
N-(2-[4-methylphenyl]-butylidene)-3'-phenylpropylamine
N-(2,2-di-[4-amylphenyl]-ethylidene)-isobutylamine
N-(2,2-di-[4-amylphenyl]-ethylidene)-cyclopentylamine
N-(2,2-di-[4-amylphenyl]-ethylidene)-benzylamine
N-(2,2-di-[4-amylphenyl]-ethylidene)-3'-phenylpropylamine
N-(2-methyl-5-phenylhexylidene)-propylamine
N-(2-methyl-5-phenylhexylidene)-cyclohexylamine
N-(2-methyl-5-phenylhexylidene)-dodecylamine
N-(2-methyl-5-phenylhexylidene)-p-chlorobenzylamine
N-(2-methyl-5-phenylhexylidene)-3'-phenylpropylamine
N-(2-ethyl-4-phenylbutylidene)-isopentylamine
N-(2-ethyl-4-phenylbutylidene)-cyclooctylamine
N-(2-ethyl-4-phenylbutylidene)-decylamine
N-(2-ethyl-4-phenylbutylidene)-p-nitrobenzylamine
N-(1-isopropyl-2-methylbutylidene)-methylamine
N-(1-isopropyl-2-methylbutylidene)-decylamine
N-(1-isopropyl-2-methylbutylidene)-cyclohexylamine
N-(1-isopropyl-2-methylbutylidene)-benzylamine
N-(1-isopropyl-2-methylbutylidene)-3'-phenylpropylamine
N-(1-methyl-2-methylpropylidene)-propylamine
N-(1-methyl-2-methylpropylidene)-cyclopentylamine
N-(1-methyl-2-methylpropylidene)-p-methoxybenzylamine
N-(1-pentyl-2-methylhexylidene)-isopropylamine
N-(1-pentyl-2-methylhexylidene)-cyclopentylamine
N-(1-pentyl-2-methylhexylidene)-p-nitrobenzylamine
N-(1-pentyl-2-methylhexylidene)-3'-phenylbutylamine
N-(1-cyclopropyl-2-phenylbutylidene)-isobutylamine
N-(1-cyclopropyl-2-phenylbutylidene)-cyclooctylamine
N-(1-cyclopropyl-2-phenylbutylidene)-benzylamine
N-(1-cyclopropyl-2-phenylbutylidene)-3'-phenylpropylamine
N-(1-cyclopropyl-2-phenylbutylidene)-aniline
N-(1-cyclooctyl-2-p-anisyl-butylidene)-butylamine
N-(1-cyclooctyl-2-p-anisyl-butylidene)-cyclopentylamine
N-(1-cyclooctyl-2-p-anisyl-butylidene)-p-methoxybenzylamine
N-(1-cyclooctyl-2-p-anisyl-butylidene)-3'-p-anisylbutylamine
N-(2-methylcyclopentylidene)-ethylamine
N-(2-methylcyclopentylidene)-hexylamine
N-(2-methylcyclopentylidene)-cyclopentylamine
N-(2-methylcyclopentylidene)-m-nitrobenzylamine
N-(2-methylcyclopentylidene)-3'-p-anisylpropylamine
N-(2-phenylcyclooctylidene)-methylamine N-(2-phenylcyclooctylidene)-cyclooctylamine
N-(2-phenylcyclooctylidene)-benzylamine
N-(2-phenylcyclooctylidene)-aniline
N-(2-phenylcyclooctylidene)-3'-phenylbutylamine
N-(1-vinylisopentylidene)-propylamine
N-(1-vinylisopentylidene)-cyclohexylamine
N-(1-vinylisopentylidene)-p-bromobenzylamine
N-(1-vinylisopentylidene)-3'-p-bromophenylpropylamine
N-(1-cyclopentyl-6-nonylidene)-isobutylamine
N-(1-cyclopentyl-6-nonylidene)-cyclopropylamine
N-(1-cyclopentyl-6-nonylidene)-o-ethoxybenzylamine
N-(1-cyclopentyl-6-nonylidene)-4'-p-anisylbutylamine
N-(1,3,3-triphenylethylidene)-butylamine
N-(1,3,3-triphenylethylidene)-cyclohexylamine
N-(1,3,3-triphenylethylidene)-benzylamine
N-(1,3,3-triphenylethylidene)-4'-phenylbutylamine
N-(1-naphthylpropylidene)-octylamine
N-(1-naphthylpropylidene)-cycloheptylamine
N-(1-naphthylpropylidene)-benzylamine
N-(1-napthylpropylidene)-3'-phenylpropylamine
N-(1,2-di-[2-furyl]ethylidene)-propylamine
N-(1,2-di-[2-furyl]ethylidene)-cyclopentylamine
N-(1,2-di-[2-furyl]ethylidene)-p-methoxybenzylamine
N-(1,2-di-[2-furyl]ethylidene)-3'-phenylbutylamine
N-(1,2-di-[2-pyrryl]-ethylidene)-propylamine
N-(1,2-di-[2-pyrryl]-ethylidene)-cyclohexylamine
N-(1,2-di-[2-pyrryl]-ethylidene)-benzylamine
N-(1,2-di-[2-thienyl]-ethylidene)-propylamine
N-(1,2-di-[2-thienyl]-ethylidene)-cyclohexylamine
N-(1,2-di-[2-thienyl]-ethylidene)-benzylamine
N-(1,2-di-[3-pyridyl]-ethylidene)-methylamine
N-(1,2-di-[3-pyridyl]-ethylidene)-cyclopropylamine
N-(1,2-di-[3-pyridyl]-ethylidene)-p-nitrobenzylamine
N-(1,2-di-[3-pyridyl]-ethylidene)-3'-phenylpropylamine
N-(1,2-di-[4-quinolyl]-propylidene)-decylamine
N-(1,2-di-[4-quinolyl]-propylidene)-cycloheptylamine
N-(1,2-di-[4-quinolyl]-propylidene)-benzylamine
N-(1,2-di-[4-quinolyl]-propylidene)-3'-p-anisylpropylamine
N-(1,2-di-[p-tolyl]-butylidene)-propylamine
N-(1,2-di-[p-tolyl]-butylidene)-cyclopentylamine
N-(1,2-di-[p-tolyl]-butylidene)-o-methoxybenzylamine
N-(1,2-di-[p-tolyl]-butylidene)-4'-phenylbutylamine
N-(1,2-di-[4-amylphenyl]-hexylidene)-isopropylamine
N-(1,2-di-[4-amylphenyl]-hexylidene)-cyclohexylamine
N-(1,2-di-[4-amylphenyl]-hexylidene)-benzylamine
N-(1,2-di-[4-amylphenyl]-hexylidene)-4-p-chlorophenylbutylamine
N-(1-isopropyl-4-phenylbutylidene)-isopropylamine
N-(1-isopropyl-4-phenylbutylidene)-cyclopropylamine
N-(1-isopropyl-4-phenylbutylidene)-p-bromobenzylamine
N-(1-isopropyl-4-phenylhexylidene)-isobutylamine
N-(1-isopropyl-4-phenylhexylidene)-cycloheptylamine
N-(1-isopropyl-4-phenylhexylidene)-benzylamine
N-(1-isopropyl-4-phenylhexylidene)-4'-p-bromophenylbutylamine
N-(1-isopropyl-4-phenylhexylidene)-p-methoxyaniline
N-(1-isopropyl-4-phenylhexylidene)-p-nitroaniline
N-(1-isopropyl-4-phenylhexylidene)-p-bromoaniline
N-(1-isopropyl-4-phenylhexylidene)-p-chloroaniline The synthesis illustrated by Equation I is carried out by contacting the starting monomeric imine reactant with manganese dioxide, nickel peroxide or lead dioxide for a period sufficient to permit the desired reaction to proceed. Contacting of the monomeric imine with the specified metal oxides can be accomplished in any convenient manner. For example, the monomeric imine reactant and metal oxide can be slurried together or the imine reactant can be passed through a bed of the specified metal oxides. Two moles of the monomeric imine are employed and the synthesis can be carried out at a temperature ranging from ambient to 170° C. or higher. It is usually preferred, however, to conduct the reaction at an elevated temperature ranging from about 40 to 130° C. It is also preferred to carry out the reaction in an inert atmosphere and in the presence of an inert solvent such as hexane, dioxane, pentane, tetrahydrofuran, benzene, pyridine, tertiary butanol, methylene chloride, chloroform and the like. When employing temperatures ranging from ambient to 170° C. the desired reaction is generally completed in a period ranging from about 1 to about 64 hours.

At the end of the reaction period the reaction product is separated from the insoluble oxides by filtration and the solvent, if one is employed, can be removed by distillation at reduced pressure. Any undesired by-products such as aldehydes, nitriles and amides can be removed by fractional distillation, gas phase chromatography and like means.

The nickel peroxide or manganese dioxide or lead dioxide is employed in the synthesis of the invention in amounts ranging from about 2 to 10 moles per mole of the monomeric imine reactant. Anhydrous or hydrated manganese dioxide or commercial manganese dioxide ores commonly utilized in organic syntheses can be employed, although it is usually preferred to use activated manganese dioxide prepared by modification of the Attenburrow procedure as described in Journal of Chemical Society, 1952, 1094–1111. Preferably the nickel peroxide employed is prepared as described in the Journal of Organic Chemistry, 27, 1952–1601 (1962) although other nickel peroxides can be employed. Purified and technical grades of lead dioxide can be employed.

The following specific examples illustrate the synthesis of this invention as illustrated in Equation I.

EXAMPLE 1

Reaction of N-isobutylideneisobutylamine with manganese dioxide to give N,N'-diisobutyl-2,2,3,3-tetramethylsuccinaldimine In a round bottom flask, equipped with a stirrer and reflux condenser with a gas inlet-outlet valve, was placed 45 grams of activated manganese dioxide, 200 milliliters of dioxane and 20 grams of N-isobutylideneisobutylamine. This mixture was then stirred at reflux for a period of 24 hours. A slight positive nitrogen pressure was maintained in the reaction vessel during reaction by means of a gaseous nitrogen filled balloon connected to the gas inlet valve attached to the condenser outlet. The reaction mixture was cooled to ambient temperature and the solid manganese oxides removed by filtration. The manganese oxides were washed with several portions of dioxane and the filtrates combined. The solvent (dioxane) was removed from the combined filtrate under reduced pressure to give a crude oil which was purified by distillation. Distillation over a 4-inch Vigreaux column afforded 1.6 grams forerun and 11.13 grams of dimeric material boiling predominantly at 124–130° (11 mm.). This material was identified as N,N'-diisobutyl-2,2,3,3-tetramethylsuccinaldimine by comparison of its infrared and nuclear magnetic resonance spectra with those of a known sample. This reaction is illustrated as follows:

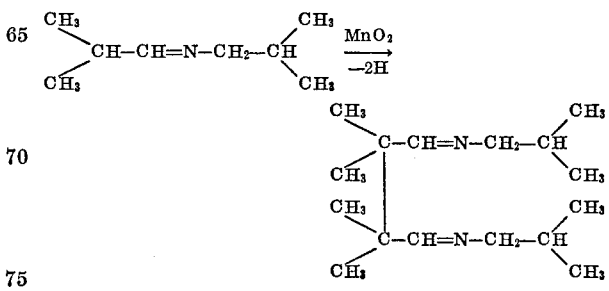

EXAMPLE 2

Reaction of N-isobutylideneisobutylamine with nickel peroxide to give N,N'-diisobutyl-2,2,3,3-tetramethylsuccinaldimine The procedure of Example 1 was repeated to give a similar reflux mixture except that 23 grams of N-isobutylideneisobutylamine, 100 milliliters of dioxane and 18 grams of nickel peroxide were employed. The product mixture yielded 5.25 grams of crude oil along with an estimated 15 grams of recovered N-isobutylideneisobutylamine. The 5.25 grams of crude oil was distilled over a 4-inch Vigreaux column to give a fraction (0.99 g.) boiling point 27–50° (3 mm.) which was identified as predominantly N,N' - diisobutyl-2,2,3,3-tetramethylsuccinaldimine by comparison of its characteristic infrared and nuclear magnetic resonance spectra with those of a known sample.

EXAMPLE 3

Reaction of N-isobutylideneisobutylamine with lead dioxide to give N,N'-diisobutyl-2,2,3,3-tetramethylsuccinaldimine A mixture of 150 milliliters hexane, 86 grams lead dioxide and 15 grams N-isobutylideneisobutylamine was prepared and heated at reflux with agitation under a nitrogen atmosphere for six days, cooled and filtered. After washing the metal oxides the combined filtrates were stripped of hexane under reduced pressure to yield 11.2 grams of a crude yellow oil. Vapor phase chromatographic analysis over a 10-foot, 10% SE–30 column (¼" diameter) at 185° isothermal indicated three major peaks. The material eluting first was identified as N-isobutylideneisobutylamine by comparison of retention times. The second material which comprised the majority of the total volatiles was identified by vapor phase chromatography retention times as N,N' - diisobutyl-2,2,3,3-tetramethylsuccinaldimine. Distillation gave 8.0 grams of material, boiling point 120–126°/10 millimeters which was essentially pure N,N' - diisobutyl-2,2,3,3-tetramethylsuccinaldimine, identical in every respect with a known sample.

EXAMPLE 4

Reaction of N-(2-methylbutylidene)-isobutylamine with manganese dioxide to give N,N'-diisobutyl-2,3-diethyl-2,3-dimethylsuccinaldimine The procedure of Example 1 was repeated to give a similar reflux mixture except that 35 grams of N-(2-methylbutylidene)-isobutylamine, 50 grams of activated manganese dioxide and 250 milliliters of purified dioxane were employed. The product mixture afforded 24.3 grams of crude oil which was distilled over a 4-inch Vigreaux column. Distillation afforded 15.8 grams of material boiling point 96–106° (3 mm.) which was identified as N,N'-diisobutyl-2,3-diethyl-2,3-dimethylsuccinaldimine, by the following spectral data: the infrared spectrum showed strong imine (—CH=N—) absorption at 6.01μ; the nuclear magnetic resonance spectrum indicated ethyl groups by the presence of triplet methyl absorptions centered at 9.25τ; the gem methyl groups

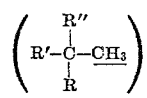

showed as singlets at 9.0τ, the methyls on the isopropyl groupings showed as doublets centered at 9.05τ while the methylenes adjacent to the nitrogen (=N—CH₂—CH<) appeared as a doublet centered at 6.82τ and the aldimine protons (—N=CH—) showed at 2.50τ; the proton integral was consistent for the proposed structure; the mass spectrum gave a molecular ion m/e 280. This reaction is represented as follows:

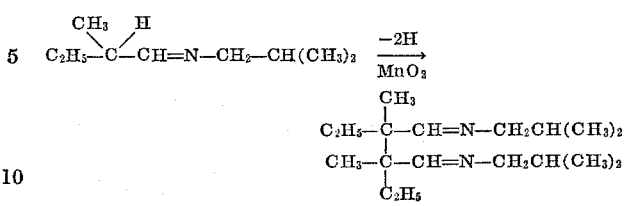

EXAMPLE 5

In a manner similar to the foregoing examples, manganese dioxide or nickel peroxide or lead dioxide are employed to convert N-(isobutylidene)-methylamine to N,N'-dimethyl - 2,2,3,3 - tetramethylsuccinaldimine; N-(2-methylpentylidene)-isobutylamine to give N,N'-diisobutyl-2,3 - dimethyl-2,3-dipropylsuccinaldimine; N-(2-methylbutylidene)-n-butylamine to give N,N'-di-(n-butyl)-2,3-diethyl - 2,3 - dimethylsuccinaldimine; N-(1,2-dimethylpropylidene)-isobutylamine to give N,N'-diisobutyl-3,3,4,4-tetramethyl - 2,5 - hexanediketimine; N-(2,2-diphenylethylidene)-n-pentylamine to give N,N'-di-(n-pentyl)-2,2,3,3 - tetraphenylsuccinaldimine; N-(2-phenylcyclohexylidene)-ethylamine to give 2,2' - bis-[N-(2-phenylcyclohexylidene)-ethylamine].

In accordance with a second embodiment of the invention, substituted pyrroles are obtained as the end product by using as a reactant an organo imine having a saturated carbon atom with two hydrogens thereon in alpha position to the imine function. This reaction can be illustrated by the following equation:

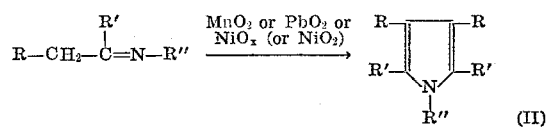

wherein

R = alkyl of 1 to 8 carbon atoms, cycloalkyl of 3 to 8 carbon atoms, aralkyl of 8 to 10 carbon atoms or alkaryl of 7 to 11 carbon atoms;

R' = hydrogen, alkyl of 1 to 4 carbon atoms, cycloalkyl of 3 to 8 carbon atoms, phenyl, heteroaryl selected from furyl, thienyl, pyrryl and pyridyl, aralkyl of 8 to 10 carbon atoms or alkaryl of 7 to 10 carbon atoms; and R" = alkyl of 1 to 12 carbon atoms, cycloalkyl of 3 to 8 carbon atoms, aralkyl of 7 to 10 carbon atoms or phenyl;

provided further that each of said phenyl groups can be with or without substituents selected from halogen, alkoxyl or nitro.

Specific representative imines of the type utilized in the above Equation II are the following:

N-propylidenemethylamine
N-propylidenepropylamine
N-propylideneoctylamine
N-propylidenedodecylamine
N-propylidenecyclopropylamine
N-propylidenecyclohexylamine
N-propylidenecyclooctylamine
N-propylideneaniline
N-propylidene-p-methoxyaniline
N-propylidene-p-chloroaniline
N-propylidene-p-bromoaniline
N-propylidene-p-nitroaniline
N-propylidenebenzylamine
N-propylidene-p-methoxybenzylamine
N-propylidene-m-nitrobenzylamine
N-propylidene-p-chlorobenzylamine
N-propylidene-4'-phenylbutylamine N-propylidene-4'-p-methoxyphenylbutylamine
N-decylideneethylamine
N-decylidenebutylamine
N-decylidenedecylamine
N-decylidenecyclopropylamine
N-decylidenecyclopentylamine
N-decylidenecyclooctylamine
N-decylideneaniline
N-decylidene-p-ethoxyaniline
N-decylidene-o-chloroaniline
N-decylidene-p-methoxybenzylamine
N-decylidene-4'-phenylbutylamine
N-(1-methylhexylidene)-isopropylamine
N-(1-methylhexylidene)-octylamine
N-(1-methylhexylidene)-cyclopentylamine
N-(1-methylhexylidene)-p-methoxyaniline
N-(1-methylhexylidene)-p-nitrobenzylamine
N-(1-methylhexylidene)-3'-phenylbutylamine
N-(1-butylheptylidene)-isobutylamine
N-(1-butylheptylidene)-decylamine
N-(1-butylheptylidene)-cyclopropylamine
N-(1-butylheptylidene)-cyclooctylamine
N-(1-butylheptylidene)-aniline
N-(1-butylheptylidene)-benzylamine
N-(1-butylheptylidene)-3'-phenylpropylamine
N-(1-cyclopropylpentylidene)-methylamine
N-(1-cyclopropylpentylidene)-pentylamine
N-(1-cyclopropylpentylidene)-octylamine
N-(1-cyclopropylpentylidene)-cyclopropylamine
N-(1-cyclopropylpentylidene)-cycloheptylamine
N-(1-cyclopropylpentylidene)-aniline
N-(1-cyclopropylpentylidene)-p-chloroaniline
N-(1-cyclopropylpentylidene)-p-chlorobenzylamine
N-(1-cyclopropylpentylidene)-3'-anisylbutylamine
N-(1-cyclooctylheptylidene)-isopropylamine
N-(1-cyclooctylheptylidene)-dodecylamine
N-(1-cyclooctylheptylidene)-cyclopentylamine
N-(1-cyclooctylheptylidene)-p-methoxyaniline
N-(1-cyclooctylheptylidene)-3'-p-chlorophenylbutylamine
N-(1-cyclooctylheptylidene)-o-methoxybenzylamine
N-(1-phenyl-5-phenylhexylidene)-isobutylamine
N-(1-phenyl-5-phenylhexylidene)-decylamine
N-(1-phenyl-5-phenylhexylidene)-cyclohexylamine
N-(1-phenyl-5-phenylhexylidene)-aniline
N-(1-phenyl-5-phenylhexylidene)-benzylamine
N-(1-phenyl-5-phenylhexylidene)-3'-nitrophenylpropylamine
N-(1-furylhexylidene)-pentylamine
N-(1-pyrrylbutylidene)-cyclopentylamine
N-(1-thienylpentylidene)-aniline
N-(1-(3'-pyridyl)-octylidene)-p-methoxybenzylamine
N-(1-(2'-pyridyl)-hexylidene)-3''-phenylbutylamine
N-(1-[p-tolyl]-hexylidene)-propylamine
N-(1-[p-tolyl]-hexylidene)-decylamine
N-(1-[p-tolyl]-hexylidene)-cyclopropylamine
N-(1-[p-tolyl]-hexylidene)-cyclooctylamine
N-(1-[p-tolyl]-hexylidene)-benzylamine
N-(1-[p-tolyl]-hexylidene)-aniline
N-(1-[p-tolyl]-hexylidene)-3'-phenylbutylamine
N-(1-[p-butylphenyl]-hexylidene)-butylamine
N-(1-[p-butylphenyl]-hexylidene)-cyclohexylamine
N-(1-[p-butylphenyl]-hexylidene)-p-chlorobenzylamine
N-(1-[p-butylphenyl]-hexylidene)-p-nitroaniline
N-(1-[p-butylphenyl]-hexylidene)-4'-p-chlorophenylbutylamine
N-(1-phenylethylhexylidene)-isobutylamine
N-(1-phenylethylhexylidene)-dodecylamine
N-(1-phenylethylhexylidene)-cyclopropylamine
N-(1-phenylethylhexylidene)-cycloheptylamine
N-(1-phenylethylhexylidene)-p-nitroaniline
N-(1-phenylethylhexylidene)-4'-p-chlorophenylbutylamine
N-(1-[4'-p-anisylbutyl]-hexylidene)-isopropylamine
N-(1-[4'-p-anisylbutyl]-hexylidene)-decylamine
N-(1-[4'-p-anisylbutyl]-hexylidene)-cyclohexylamine
N-(1-[4'-p-anisylbutyl]-hexylidene)-p-methoxyaniline
N-(1-[4'-p-anisylbutyl]-hexylidene)-3''-p-methoxyphenylbutylamine
N-(1-[4'-p-anisylbutyl]-hexylidene)-benzylamine The reaction illustrated in Equation II is carried out in similar manner as is the reaction of Equation I. The synthesis illustrated by Equation II is further illustrated by the following specific examples.

EXAMPLE 6

Reaction of N-(n-valerylidene)-isobutylamine with manganese dioxide to give 1-isobutyl-3,4-di-(n-propyl)-pyrrole The procedure of Example 1 was repeated to give a similar reflux mixture except that 32 grams of N-(n-valerylidene)-isobutylamine, 50 grams of activated manganese dioxide and 200 milliliters of dioxane were employed. The product mixture afforded a dark crude oil which on distillation over a 4-inch Vigreaux column gave 8.1 grams of yellow oil, boiling point 58–70° (3 mm.). This fraction was analyzed by vapor-phase chromatography and shown to consist predominantly of a 1:1 mixture of N-(2-propyl-2-heptenylidene)-isobutylamine and 1-isobutyl-3,4-di-(n-propyl)-pyrrole, identified by their characteristic spectra.

The N-(2-n-propyl-2-heptenylidene)-isobutylamine gave strong α,β-unsaturated imine absorption

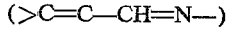

in the infrared at 6.07μ while the nuclear magnetic resonance spectrum confirmed the structural assignment as follows: the —C₂H₅ and

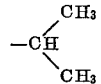

groups were observed as multiple absorptions at 9.07–9.18τ while the =C—CH₂—C₂H₅ methylene absorptions (triplet) were centered at 7.82τ, the =N—CH₂— methylene appeared as a doublet at 4.42τ, the aldimine —CH=N— proton absorbed at 2.54τ; the proton integration was consistent for this structure. The mass spectrum showed the molecular ion at m/e 209.

The 1-isobutyl-3,4-di-(n-propyl)-pyrrole afforded the following spectral characteristics: The infrared spectrum had characteristic 1,3,5-trialkylpyrrole absorptions at 6.51μ, 8.63μ and 13.03μ; the nuclear magnetic resonance spectrum confirmed the structure with the saturated methyls and methylenes showing at 9.04τ (center), the =C—CH₂— protons appeared as doublets at 7.60τ, the N—CH₂— protons appeared as a doublet at 6.26τ and the protons at positions 2- and 5- on the pyrrole ring were present as a singlet at 3.40τ; the proton integration was consistent for this structure. The mass spectrum gave a molecular ion peak at m/e 207 as expected. This reaction is represented as follows:

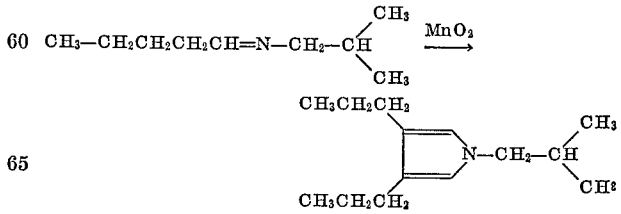

EXAMPLE 7

The reaction of N-(3-methyl-n-butylidene)-n-butylamine with manganese dioxide to give 1-n-butyl-3,4-diisopropylpyrrole The procedure of Example 1 was repeated to prepare a similar reflux mixture except that 23 grams of N-(3-methyl-n-butylidene)-n-butylamine, 50 grams of activated manganese dioxide and 150 milliliters of dioxane were employed. The product mixture afforded 15.4 grams of a crude oil which on distillation under reduced pressure gave 4.45 grams of material boiling point 35–100° (mainly at 64–66°) at 0.05 millimeter of mercury. This material analyzed as a mixture of three principal components, A (23%), B (39%) and C (15%) on vapor-phase chromatography. The components were separated by preparative gas phase chromatography and products A and B were identified by the characteristic spectral properties of these compounds.

Product A was identified as N-(2-isopropyl-5-methyl-2-hexenylidene)-butylamine by its infrared spectrum which exhibited the characteristic α,β-unsaturated imine absorption at $6.05\mu$ and $6.14\mu$ (shoulder); the mass spectrum exhibited a molecular ion peak at 209 as expected.

Product B was identified as 1-n-butyl-3,4-diisopropylpyrrole by its characteristic spectra: the infrared spectrum exhibited absorptions at $6.52\mu$, $8.49\mu$ and $12.90\mu$ characteristic of 1,3,4-trialkylpyrroles; the nuclear magnetic resonance spectrum exhibited a doublet at $8.78\tau$ and $8.90\tau$ for the isopropyl methyl absorptions, a quartet centered at $7.20\tau$ for the $=C—\underline{CH}_3)_2$ protons, a triplet centered at $6.28\tau$ corresponding to the methylene adjacent to the nitrogen ($>N—CH_2—CH_2—$), and singlet proton absorption at $3.75\tau$ corresponding to the protons at the 2,5-positions on the pyrrole ring; the nuclear magnetic resonance spectrum integrated correctly; the mass spectrum gave a molecular ion at m/e 207. The reaction is illustrated as follows:

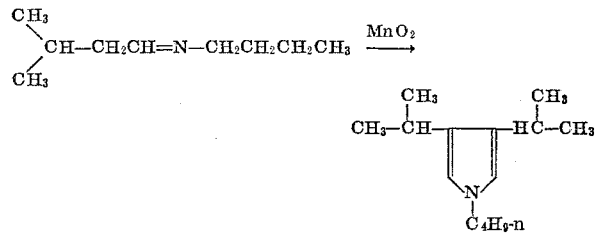

EXAMPLE 8

Reaction of N-(n-butylidene)-isobutylamine with manganese dioxide to give 1-isobutyl-3,4-diethylpyrrole The procedure of Example 1 was repeated to prepare a similar reflux mixture except that 20 grams of N-(n-butylidene)-isobutylamine was employed instead of 20 grams of N-isobutylideneisobutylamine. This mixture was then refluxed for a period of 64 hours in a nitrogen atmosphere. The product mixture afforded approximately 18 grams of a crude dark oil which on distillation afforded 8.3 grams of material boiling mainly at 65–70° (5 mm.). Analysis indicated this fraction to be a mixture of three major components (A, B and C) in a ratio of 2:2:1. The first two components (A and B) were isolated by preparative vapor-phase chromatography.

Product A was identified as N-(2-ethyl-2-hexenylidene)-isobutylamine by the following characteristic spectral properties: the infrared spectrum gave strong α,β-unsaturated imine absorption ($>C=CH—CH=N—$) at $6.10\mu$ and $6.14\mu$ while the nuclear magnetic resonance confirmed the structure with the pertinent olefinic proton absorption ($>=\underline{CH}—CH_2—$) centered at $4.5\tau$ and the α,β-unsaturated aldimine proton ($>C=C—\underline{CH}=N—$) appeared at $1.95\tau$; the mass spectrum afforded a molecular ion at m/e 181.

Product B was identified as 1-isobutyl-3,4-diethylpyrrole by the following characteristic spectral properties: the infrared spectrum exhibited the absorptions at 6.54, 8.66 and 13.05 (microns) characteristic of 1,3,4-trialkylpyrroles while the nuclear magnetic resonance spectrum exhibited a doublet corresponding to the $—CH(CH_3)_2$ protons at 9.08 and $9.20\tau$ (6H), a triplet centered at $8.90\tau$ corresponding to the $—CH_2\underline{CH}_3$ protons (6H), a single multiplet proton absorption centered at $8.10\tau$ corresponding to the $—CH_2—\underline{CH}(CH_3)_2$ proton, a quartet centered at $7.73\tau$ (4H) corresponding to the $—\underline{CH}_2—CH_3$ protons, a doublet centered at $6.66\tau$ (2H) due to the $N—\underline{CH}_2—CH<$ protons and the protons at the 2- and 5- positions of the pyrrole ring at $4.0\tau$ (2H); the mass spectrum exhibited a molecular ion at m/e 179. This reaction is illustrated as follows:

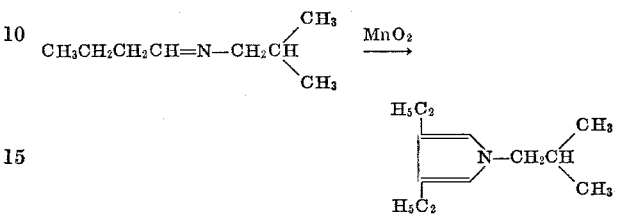

EXAMPLE 9

Reaction of N-butylideneisobutylamine with lead dioxide

A mixture of 200 milliliters dioxane, 100 grams lead dioxide and 15 grams of N-butylideneisobutylamine was prepared and refluxed with agitation for five days under nitrogen, cooled and filtered. After washing the metal oxides, the combined filtrates were stripped of solvent in vacuo to give 9.6 grams of a crude oil. Vapor phase chromatography over a 10 foot, 10% SE–30 column demonstrated numerous peaks; the major one, which comprised about 30% of the volatile components, was identified from its vapor phase chromatography retention time as N-isobutyl-3,4-diethylpyrrole by comparison with a known sample. A portion of the crude product was subjected to preparative vapor phase chromatography and a purified sample of N-isobutyl-3,4-diethylpyrrole was obtained whose infrared spectrum was identical to that of a sample previously prepared.

EXAMPLE 10

In a manner similar to the foregoing Examples 6 through 9, manganese dioxide or nickel peroxide or lead dioxide can be employed to convert N-(1-methylbutylidene)-n-butylamine to 1-n-butyl-2,5-dimethyl-3,4-diethylpyrrole; N-(1-phenylbutylidene) - n - pentylamine to 1-n-pentyl-3,4-diethyl-2,5 - diphenylpyrrole; N - (4-phenylbutylidene-isovalerylamine to 1-isovaleryl - 3,4 - di - (2'-phenylethyl)-pyrrole; N-(1-phenylbutylidene) - isobutylamine to 1-isobutyl-3,4-diethyl-2,5-diphenylpyrrole, etc.

From the foregoing it will be evident that the present invention provides a novel and simple one-step method for synthesizing dimeric imines (Schiff bases) and pyrroles. The dimeric imines find wide utility as intermediates for the preparation of diamines, succinimides and N-alkylpyrrolidines (which are useful as herbicides). The pyrrole compounds are useful as intermediates for the preparation of pyrrole dyes, N-alkylpyrrolidines and cyclic imines.

I claim:

1. A process which comprises treating at a temperature ranging from about ambient to 170° C. for a period of from about 1 to 64 hours with manganese dioxide, nickel peroxide or lead dioxide an imine of the following structure:

wherein

R=alkyl of 1 to 10 carbon atoms, cycloalkyl of 3 to 8 carbon atoms, alkenyl of 3 to 10 carbon atoms, aryl selected from phenyl and naphthyl, heteroaryl selected from furyl, pyrryl, thienyl, pyridyl, quinolyl and indolyl, aralkyl of 8 to 10 carbon atoms, alkaryl of 7 to 11 carbon atoms;

R'=alkyl of 1 to 10 carbon atoms, cycloalkyl of 3 to 8 carbon atoms, alkenyl of 3 to 10 carbon atoms, phenyl, or

considered as a unit is an alicyclic radical of 3 to 8 carbon atoms;
R''=hydrogen or alkyl of 1 to 5 carbon atoms; and
R'''=alkyl of 1 to 12 carbon atoms, cycloalkyl of 3 to 8 carbon atoms, aralkyl of 8 to 10 carbon atoms and aryl selected from phenyl and naphthyl;
provided further that each of the said aryl groups can be with or without substituents selected from halogen, alkoxyl or nitro, to form a dimeric reaction product of the following structure:

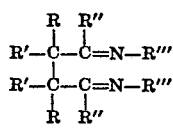

wherein R, R', R'' and R''' are the same as above.

2. The process of claim 1 wherein manganese dioxide is employed in the reaction.

3. The process of claim 1 wherein nickel peroxide is employed in the reaction.

4. The process of claim 1 wherein lead dioxide is employed in the reaction.

5. A process which comprises treating at a temperature ranging from about ambient to 170° C. for a period of from about 1 to 64 hours with manganese dioxide, nickel peroxide or lead dioxide an imine of the structure:

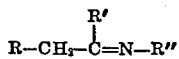

wherein
R=alkyl of 1 to 8 carbon atoms, cycloalkyl of 3 to 8 carbon atoms, aralkyl of 8 to 10 carbon atoms or alkaryl of 7 to 11 carbon atoms;
R'=hydrogen, alkyl of 1 to 4 carbon atoms, cycloalkyl of 3 to 8 carbon atoms or phenyl; and
R''=alkyl of 1 to 12 carbon atoms, cycloalkyl of 3 to 8 carbon atoms, aralkyl of 7 to 10 carbon atoms or phenyl;
provided further that each of said phenyl groups can be with or without substituents selected from halogen, alkoxyl or nitro, to form a pyrrole reaction product having the structure:

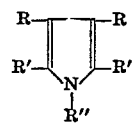

wherein R, R' and R'' are the same as above.

6. The process of claim 5 wherein manganese dioxide is employed in the reaction.

7. The process of claim 5 wherein nickel peroxide is employed in the reaction.

8. The process of claim 5 wherein lead dioxide is employed in the reaction.

References Cited
UNITED STATES PATENTS
2,421,937  6/1947  Haury _____ 250—566

ALEX MAZEL, Primary Examiner

J. A. NARCAVAGE, Assistant Examiner

U.S. Cl. X.R.

260—290 P, 313.1, 326.15, 326.9, 329, 347.7, 566 R